US010032177B2

(12) United States Patent
Patterson

(10) Patent No.: US 10,032,177 B2
(45) Date of Patent: Jul. 24, 2018

(54) COMPUTER READABLE MEDIUM, FILE SERVER, AND METHOD FOR PROVIDING OUTCOME-BASED MAPPING

(75) Inventor: Laura Patterson, Austin, TX (US)

(73) Assignee: VisionEdge Marketing, Austin, TX (US)

( * ) Notice: Subject to any disclaimer, the term of this patent is extended or adjusted under 35 U.S.C. 154(b) by 1380 days.

(21) Appl. No.: 13/356,208

(22) Filed: Jan. 23, 2012

(65) Prior Publication Data

US 2012/0191550 A1     Jul. 26, 2012

Related U.S. Application Data

(60) Provisional application No. 61/435,692, filed on Jan. 24, 2011.

(51) Int. Cl.
*G06Q 30/02* (2012.01)
*G06Q 10/06* (2012.01)

(52) U.S. Cl.
CPC ............ *G06Q 30/02* (2013.01); *G06Q 10/06* (2013.01); *G06Q 30/0276* (2013.01)

(58) Field of Classification Search
CPC ......... G06Q 10/0631; G06Q 10/06311; G06Q 10/0633
USPC ......................................... 705/7.11–7.42, 14
See application file for complete search history.

(56) References Cited

U.S. PATENT DOCUMENTS

| 5,963,910 A * | 10/1999 | Ulwick | G06Q 10/06 705/7.28 |
| 5,966,695 A * | 10/1999 | Melchione | G06Q 30/02 705/35 |
| 7,694,219 B2 * | 4/2010 | Xu | G06F 17/30899 715/234 |
| 7,698,248 B2 | 4/2010 | Olson | |
| 2003/0033192 A1 * | 2/2003 | Zyman | G06Q 10/06 705/7.36 |
| 2004/0093296 A1 | 5/2004 | Phelan et al. | |
| 2005/0038760 A1 | 2/2005 | Rasmussen | |

(Continued)

OTHER PUBLICATIONS

Robert Amar, John Stasko, A Knowledge Task-Based Framework for Design and Evaluation of Information Visualizations, 2004, IEEE Symposium on Information Visualization, IEEE, 143-149. (Year: 2004).*

*Primary Examiner* — Beth V Boswell
*Assistant Examiner* — Zahra Elkassabgi
(74) *Attorney, Agent, or Firm* — Polansky & Associates, P.L.L.C.; Paul J. Polansky

(57) ABSTRACT

A computer readable medium, a file server, and a method for outcome-based mapping provide a marketing blueprint for aligning marketing activities to quantifiable business outcomes. In one form, the computer readable medium includes instructions that, when executed by a processor, cause the processor to generate a graphical user interface including text, a plurality of user-selectable options, and text input fields. The graphical user interface prompts a user through a process of defining a business outcome-based marketing program. The instructions, when executed, also cause the processor to receive user input corresponding to the graphical user interface defining quantifiable business outcomes and associated marketing tasks, and to map the associated marketing tasks to the quantifiable business outcomes to produce a marketing blueprint.

20 Claims, 6 Drawing Sheets

(56) References Cited

U.S. PATENT DOCUMENTS

2007/0094060 A1* 4/2007 Apps ................ G06F 17/30398
705/7.36
2008/0010146 A1 1/2008 Gillespie et al.

* cited by examiner

COMPUTER READABLE MEDIUM, FILE SERVER, AND METHOD FOR PROVIDING OUTCOME-BASED MAPPING

CROSS-REFERENCE TO RELATED APPLICATION(S)

This application is a non-provisional of and claims priority to U.S. Provisional Patent Application No. 61/435,692 filed on Jan. 24, 2011 and entitled "Systems, Computer Readable Medium, and Methods for Providing Outcome-Based Mapping," which is incorporated herein by reference in its entirety.

FIELD

The present disclosure is generally related to marketing accountability, alignment and performance systems, and more particularly to systems and methods of outcome-based mapping.

BACKGROUND

Marketing is an important aspect of any successful business. Unfortunately, though many businesses invest significant resources in marketing, many businesses do not perform marketing effectively and/or do not know how to measure the effectiveness of the marketing efforts.

Typically, marketing efforts are expected to find, keep, and grow profitable customers. To find customers (acquisition), marketing focuses on processes and strategies for the acquisition of new customers and net new business. To keep customers (penetration), marketing focuses efforts on customer retention/renewals by attempting to keep customers engaged. In theory, engaged customers are more likely to stay. To grow profitable customers (monetization), marketing focuses on increasing the value of the customer base and on cross-selling efforts.

In tough economic times, marketing departments are under increased pressure to justify their spending, prove the effectiveness of their marketing investments, and demonstrate program success and value. Unfortunately, though the stated goals of the marketing efforts may appear to align with business goals, the link between the marketing effort and the desired business outcome remains undefined, and thus the value of the marketing effort is not clear.

SUMMARY

In an embodiment, a computer readable medium includes instructions that, when executed by a processor, cause the processor to generate a graphical user interface including text, a plurality of user-selectable options, and text input fields. The graphical user interface is configured to prompt a user through a process of defining a business outcome-based marketing program. The instructions further cause the processor to receive user input corresponding to the graphical user interface defining quantifiable business outcomes and associated marketing tasks and map the associated marketing tasks to the quantifiable business outcomes to produce a marketing blueprint.

In another embodiment, a method includes defining one or more quantifiable business outcomes, defining one or more quantifiable marketing objectives to achieve the one or more quantifiable business outcomes, and identifying one or more marketing strategies for each of the one or more quantifiable marketing objectives. The method further includes selecting one or more programs for each of the one or more marketing strategies, defining one or more milestones for each of the one or more marketing programs, assigning one or more activities for each of the one or more milestones to a particular user or group, and generating a marketing blueprint based on the one or more quantifiable marketing objectives, the one or more marketing strategies, the one or more programs, the one or more milestones, and the one or more activities.

In a particular embodiment, a system is provided that is configured to prompt a user (or a team of users) to produce a marketing blueprint that is aligned to the business objectives of an organization and with quantifiable metrics for evaluating the effectiveness of the marketing blueprint in achieving the business objectives. Further, over time, the system stores historical data that can be used to enhance the marketing program by tracking what strategies work best.

BRIEF DESCRIPTION OF THE DRAWINGS

In the following description, the use of the same reference numerals in different drawings indicates similar or identical items.

DETAILED DESCRIPTION OF ILLUSTRATIVE EMBODIMENTS

In general, organizations invest in marketing to understand their market and their customers. Generally, such marketing includes developing and executing a strategy to create consideration and preference that enables the organization to acquire more of something quickly and efficiently. However, the effectiveness of the marketing program (i.e., the measure of the match between the stated goals and their achievement) is all-too-often undermined by the lack of alignment between the desired business outcome and the marketing program. Further, marketing efforts are too often designed using abstract concepts without regard for quantifiable milestones and targets, which might be used to provide objective evidence of the success/value of marketing.

Embodiments of a system and an underlying methodology are described below that provide a marketing tool that offers user-selectable elements for generating quantifiable business objectives and measurable marketing objectives, strategies, programs, tactics and activities. The marketing tool can then be used to map the quantifiable business outcomes to marketing milestones (i.e., marketing objectives, strategies, programs, tactics and activities) to produce an outcome-based blueprint that aligns discrete marketing tasks to the business objectives. Further, the marketing tool is configurable to map the marketing milestones to individual marketing tasks at the level of the marketing team or at a level of the individual responsible for each marketing task or milestone.

In some embodiments, a system is described that includes a processor and a memory. The memory stores instructions that, when executed by the processor, cause the processor to generate graphical user interfaces including user-selectable elements and inputs for receiving user input. In an example, the graphical user interface can be rendered within an Internet browser application, such as a web page including embedded logic or scripts and including questions or prompts to guide the user through a process of defining business outcomes and marketing objectives, strategies, programs, tactics and activities. The user interface may include embedded logic or may communicate with a server configured to provide back-end logic to analyze the input data and to provide feedback to direct the user to refine the user inputs. In particular, such logic may analyze particular inputs to ensure that the resulting user-defined business outcomes and marketing objectives are quantifiable (measurable). Additionally, the user interface itself or the server may process the user input to produce a blueprint defined by deploying outcome-based mapping to connect discrete marketing tasks, through marketing programs, strategies, and objectives, to the business outcomes. One possible example of such a system is described below with respect to FIG. 1.

Figure 1:
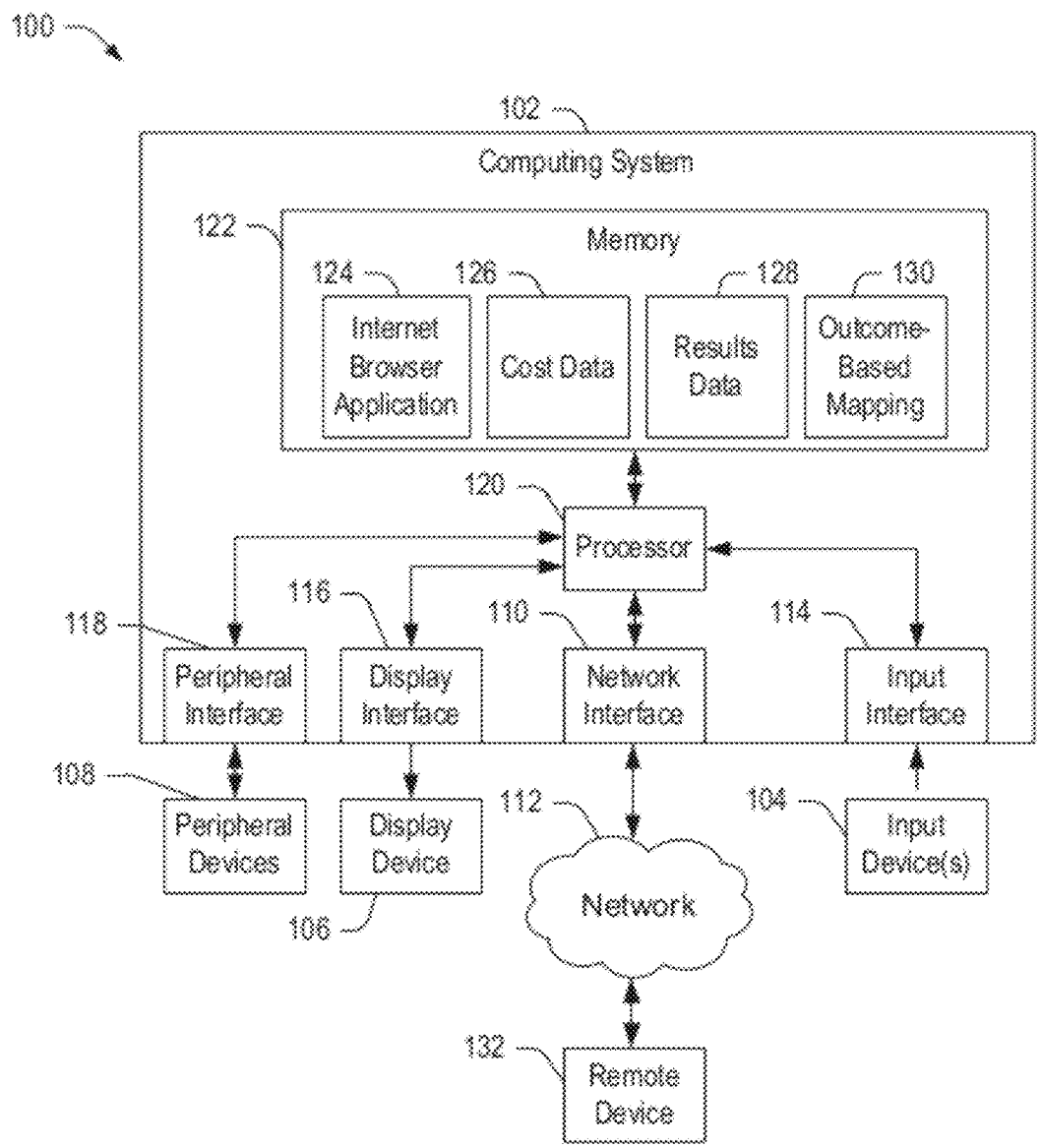
FIG. 1 is block diagram of an embodiment of a system for providing outcome-based mapping of business outcomes to marketing activities.

FIG. 1 is block diagram of an embodiment of a system 100 for outcome-based mapping of business outcomes to marketing strategies. System 100 includes a computing system 102 coupled to one or more input devices 104 for receiving user input, a display device 106 (such as a liquid crystal display (LCD)) for providing visual information, and one or more peripheral devices 108 (such as a printer, a media player, and/or other types of devices). Further, computing system 102 is coupled to a network 112, such as the Internet.

Computing system 102 includes a network interface 110 connected to network 112. Computing system 102 further includes an input interface 114 coupled to input device 104, a display interface 116 coupled to display device 106, and a peripheral interface 118 coupled to one or more peripheral devices 108. Additionally, computing system 102 includes a processor 120 coupled to input interface 114, network interface 110, display interface 116, and peripheral interface 118. Processor 120 is also coupled to a memory 122. Memory 122 is a processor-readable (or computer-readable) medium that can store processor-readable instructions.

Memory 122 stores data and instructions, which are executable by processor 120 to facilitate outcome-based mapping of quantifiable business outcomes to marketing activities. In particular, memory 122 includes an Internet browser application 124 that is executable by processor 120 to produce a GUI including data and user-selectable elements, such as pull-down menus, buttons, clickable links, images, and other elements. The Internet browser application 124 can be used to access uniform resource locations (URLs) on servers through network 112 or may render GUIs related to a program. Memory 122 further includes cost data 126 and results data. Cost data 126 includes known costs for various marketing activities, such the unit costs to print brochures, derived from previous marketing campaigns, vendor data, and other information. For example, costs for television advertising time, radio advertising, brochure production costs, and other traditional marketing costs may be stored and frequently updated to provide suitably accurate estimates that can be used to put together a budget for a marketing program. Results data 128 includes historical data corresponding to previous marketing campaigns, from which some estimated results information may be extrapolated for projecting results for the current marketing effort.

Memory 122 also stores outcome-based mapping instructions 130 that, when executed, cause processor 120 to produce a GUI (which may be a standalone window or which may be rendered within the Internet browser application 124), including user-selectable elements, text-inputs, and buttons for receiving user input. The GUI includes text and/or queries designed to prompt the user to define quantifiable business outcomes and measurable marketing objectives, programs, strategies, milestones, and actions to produce a marketing plan that provides both a financial value and business impact view into a marketing investment. Further, outcome-based mapping instructions 130 include instructions to map marketing activities to quantifiable business outcomes to produce a marketing blueprint and to apply metrics to analyze performance and results data to produce a report indicating effectiveness of the marketing plan (prospectively based on cost data 126 and results data 128, during execution as real data is collected, and after the marketing effort is completed.

Computing system 102 can be any data processing system having at least a network interface 110, an input interface 114, a processor 120, and a memory 122. The input interface 114 may be a touch screen interface that combines display and input functionality. Representative examples of computing system 102 include smart phones, laptop computers, tablet computers, computer servers, or other data processing systems. In an embodiment, computing system 102 can be implemented as a web server configured to execute outcome-based mapping instructions 130 to produce web pages, which can be provided to a remote device, such as remote device 132 through network 112. In this example, network 112 represents a communications network, such as the Internet, and a user can access computing system 102 through network 112 to configure a marketing blueprint by interacting with the web pages received from computing system 102.

While in the above-example, the outcome-based mapping instructions 130 are depicted as a single block, it should be appreciated that the outcome-based mapping instructions 130 cause processor 120 to perform a wide variety of operations and to provide various inputs and outputs to guide the user through a process of performing a include multiple functions and aspects, some of which are depicted as separate functional blocks and described below with respect to FIG. 2.

Figure 2:
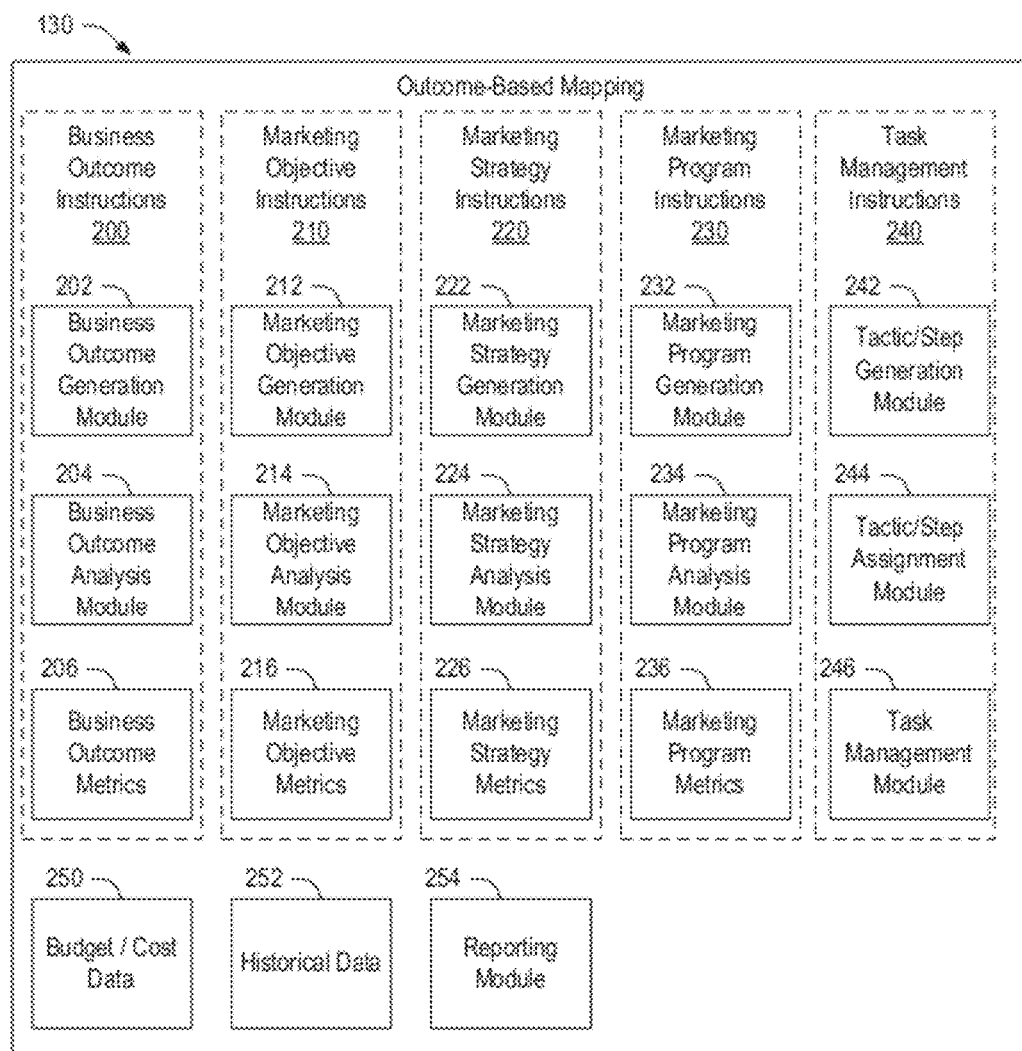
FIG. 2 is a functional block diagram of outcome-based mapping instructions of the system of FIG. 1.

FIG. 2 is a functional block diagram of outcome-based mapping instructions 130 of the system 100 of FIG. 1. Outcome-based mapping instructions 130, when executed by processor 120, cause processor 120 to map marketing activities to quantifiable business outcomes, aligning measurable marketing plan activities with the desired business outcome, to produce a marketing plan blueprint and outcome-based marketing budget. The marketing blueprint includes quantifiable metrics, making it possible to adopt and apply a measurement framework that establishes clear standards of performance and metrics, including a performance measurement system based on data and analytics, which can be applied to facilitate fact-based decision-making, in the context of marketing and to track and report results.

Outcome-based mapping instructions 130 include business outcome instructions 200, marketing objective instructions 210, marketing strategy instructions 220, marketing program instructions 230, and task management instructions 240. Business outcome instructions 200 include a business outcome generation module 202, business outcome analysis module 204, and business outcome metrics 206. Marketing objective instructions 210 include a marketing objective generation module 212, a marketing objective analysis module 214, and marketing objective metrics 216. Marketing strategy instructions 220 include a marketing strategy generation module 222, a marketing strategy analysis module 224, and marketing strategy metrics 226. Marketing program instructions 220 include a marketing program generation module 232, a marketing program analysis module 234, and marketing program metrics 236. Task management instructions 240 include a tactic/step generation module 242, a tactic/step assignment module 244, and a task management module 246. Further, outcome-based mapping instructions 130 include budget/cost data calculation instructions 250, historical data processing instructions 252, and a reporting module 254.

Outcome-based mapping instructions 130 implement a business-outcome driven methodology for constructing a marketing plan, which generates a graphical user interface to guide a user through the development of a marketing program starting from the desired business outcome and working backward through multiple stages. Business outcome generation module 202 is configured to guide the user through various steps to define one or more quantifiable business outcomes, which are the outcomes that marketing is going to impact. As used herein, a "quantifiable business outcome" is a goal or target that is specific, quantifiable, and customer centric. The business outcome is the starting point and serves as the foundation for everything that follows. In particular, the business outcome generation module 202 can assist a user in identifying business decisions to be made by helping the user define what constitutes success for the organization and to select those elements that can be impacted by marketing.

Some examples of quantifiable business outcomes include "Acquire X new software licenses at $X00 average order value resulting in $x.x M in revenue before the end of the fiscal year"; "Secure new software licenses at $xK average order value from Y number of existing customers resulting in $ZM revenue before the end of the fiscal year"; "Convert S number (25%) of T number of Widget Customers to XBZ platform by the middle of the fiscal year resulting in $XM revenue"; etc. Each of these examples relates to a quantifiable goal with respect to customers and within a measurable time frame. Business outcome generation module 202 provides a user interface including user-selectable elements (such as drop-down or pull-down menus, text inputs, numeric inputs, and other elements), prompts, queries, and instructions to guide a user through a process of configuring one or more quantifiable business outcomes. In one mode, business outcome generation module 202 provides a free form text input window for an experienced user to enter a quantifiable business outcome. In another mode, the user-selectable elements provide a structured input to assist the user in producing a quantifiable business outcome.

Business outcome analysis module 204 evaluates the business outcome to confirm that it is quantifiable (measurable) and that it relates to customer-based outcomes (i.e., is customer centric). Business outcome analysis module 204 may provide error messages and/or instructions to assist the user to refine the business outcome if the business outcome is indefinite in some way or is otherwise not quantifiable. For example, if the business outcome does not specify a time-based goal (such as the end of the fiscal year or a specified date), business outcome analysis module 204 may prompt the user to enter a target date.

Business outcome metrics 206 may be applied later, after other aspects of the marketing plan blueprint are defined, to evaluate the success and/or failure of a particular marketing program. In particular, business outcome metrics 206 can be used to evaluate the end results of execution of the marketing blueprint.

Once the business outcome is defined, outcome-based mapping instructions 130 prompt the user through a process of defining one or more marketing objectives for achieving the business outcome. As used herein, the term "marketing objective" refers to a realistic, measurable, time-specific, marketing goal or target that is aligned and consistent with the organization's priorities. Examples of outcome-based marketing objectives include "Increasing a referral rate of existing customers by 40% by year end to accelerate sales cycle by 10%"; "25% (Z number) of existing customers will adopt new XYZ product within six months of launch at launch price $A"; "Contribute 25% of the qualified new opportunities quarterly to the pipeline;" and "Improve customer advocacy score by 10% by year end,"

Marketing objective instructions 210 facilitate creation of marketing objectives that align directly to the business outcomes. Marketing objective generation module 212 produces a user interface including user-selectable elements and inputs (such as those described above) that allow a user to define marketing objectives that are measurable and that are aligned with the business outcome. From the outset, the user may select one of the business outcomes to which the particular marketing objective is aligned by accessing a pull-down menu that lists one or more of the previously defined quantifiable business objectives. This selection process places the business outcome front and center during the marketing objective creation process.

Since marketing generally involves finding customers, keeping customers, and growing the value of customers, marketing objective generation module 212 facilitates creation of marketing objectives related to the job of marketing, including objectives that tie directly to the business outcome. In once example, a business outcome is to "close revenue gap by $X by year end, and the marketing objectives include reducing "customer churn by P % in the next six months" and increasing "margin/product to $Q by year end. In general, marketing can assist in achieving a business outcome involving increased revenue by increasing new sales (i.e., new customers) and by retaining/growing existing customers. Thus, marketing objective generation module 212 provides user inputs and selectable elements for defining marketing objectives directed toward such new and existing customer development. Some examples of measurable marketing objectives include "Launch a '0' defect upgrade release to the existing customer base to accelerate the renewal rate by X % by Y date" and/or "Register X number of widget customers for the migration program and convert them to the new platform within Y timeframe." In each example, the marketing objective involves moving some a quantifiable number, percent, range, etc. of customers to take an action within a specified time range. In some instances, the objective may be aligned with an existing program (such as a new platform launch or an upgrade release).

The resulting marketing objectives are measurable in terms of customers and in terms of time, and serves as the basis for setting performance targets and for defining the underlying strategies. Marketing objective analysis module 214 analyzes the user inputs to verify that the marketing objective is quantifiable and to assist the user in refining the marketing objectives as needed. Marketing objective metrics 216 can be applied at a later time to evaluate the effectiveness and relative success of the particular marketing objective.

Marketing strategy instructions 220 are configured to assist and prompt a user through a process of defining a strategy for achieving the marketing objectives. Unless the company is new, the market is new, or the product is new to a new market, the marketing strategy should focus on consideration and preference as opposed to awareness. The marketing strategy should complement the business strategy. Marketing strategies include product-related strategies (such as product teasers, seeding/trial/sample, product rewards/special offers included limited time discounts and/or bundling), product placement, and carrot/stick approaches); people-related strategies (such as grass roots or community customer development (e.g., social networking), alliance development, market influencer development, evangelist development, endorsement development (independent third party/sponsor/celebrity), one-on-one sales/ambassador development, sales incentives, and service quality); and market-related strategies (e.g., shock and awe, persona/horizontal, domain/niche/vertical, domino/king pin, pincer/flanking, stepping stone/adjacent market, tipping point, divide and conquer/segmentation, and infiltration of competitor's customers).

Marketing strategy generation module 222 prompts the user through a process of selecting one or more marketing strategies for achieving a particular marketing objective. In an example, marketing strategy generation module 222 generates a user interface including a pull-down menu that lists one or more marketing objectives from which a user may select. These marketing objectives were previously created using a user interface produced by processor 120 by executing marketing objective instructions 210 and through user interactions with the resulting interface. Once one of the marketing objectives is selected, marketing strategy generation module 222 provides one or more user-selectable options that allow the user to define one or more strategies for achieving the marketing objective. At this step, the user may select an existing marketing strategy (such as one or more of those listed above) or may create a new strategy.

In an example, a marketing objective may include "acquiring X-Y number of Tier 1 and Tier 2 new customers and a-b Tier 3 and Tier 4 new customers resulting in $ZM in revenue." Marketing strategy generation module 222, when executed by processor 120, produces a user interface that allows the user to select this marketing objective and to define one or more marketing strategies to achieve the marketing objective. Marketing strategies are implemented via marketing programs. A marketing strategy around trial would have a corresponding performance-based marketing program designed to successfully leverage the strategy. Referral is an example of a marketing strategy that would be deployed to increase the rate of customer acquisition within Market A by X % and improve the win ratio by Y %. Another strategy, sampling or product placement, might be used to achieve a marketing objective to "generate Y+new Tier 1 and Tier 2 and Z+Tier 3 and Tier 4 targets that request a target trial by D date to improve the target leads to a qualified conversion rate of P %. Since these marketing strategies may have been employed before, using various product-based, people-based, or market-based outcomes, data may be available for estimating costs and results from cost data 126 and results data 128, for example.

In some instances, to develop a trackable, reportable, controllable metric of performance, it may be necessary to use proxies. A proxy is a substitute that can be developed by establishing or using one or more assumptions. For example, in some instances, it may be difficult to measure a share of wallet (a share of money spent by customers on the company's product as compared to the same customer's spending within the market niche) directly because you may not know how much a customer is actually spending with a competitor. A proxy might be a percentage of customers in each market segment that have a particular number of your products that might provide insight into share of wallet. In one example, the proxy for the wallet could be the number of products per customer. In this instance, the assumption is that the company's share of wallet is higher at those companies who have multiple products.

Marketing strategy analysis module 224 analyzes the marketing strategy data provided by the user to ensure that the resulting marketing strategy is quantifiable in terms of a measurable goal that is customer-based and that has a definable time-table that corresponds to the business objectives. If the marketing strategy encompasses a time frame that is outside of the time frame defined previously within the associated marketing objective or the business outcome, marketing strategy analysis module 224 generates an error and prompts the user to correct the timeframe or to otherwise refine the strategy.

Marketing performance metrics 226 can be applied later to measure the effectiveness of the marketing strategy in relation to intended business outcome. Marketing performance metrics 226 can also evaluate the relationship between projected results (e.g., historical data) and actual results to quantify error margins for future applications.

Marketing program instructions 230 provides user-selectable elements and inputs for receiving user input to define a marketing program for implementing a selected marketing strategy. In particular, marketing program generation module 232 provides user-selectable elements and inputs as well as prompts to assist the user in defining a series of marketing programs. A marketing program (campaign) includes a series of specific, defined series of tactics (e.g., social media, public relations (PR), word of mouth (WOM), direct mail, events) and activities (tasks or steps such as list development, content development) used to bring the marketing strategy to life. It should be appreciated that the marketing program instructions 230 may, in some instances, be consolidated within marketing strategy instructions 220. However, in other instances, it may be desirable to maintain the marketing strategy and the marketing programs as separate aspects. Further, in some instance, the marketing program may be described as multiple discrete tasks/tactics/activities rather than as an overarching program. In such an instance, marketing program instructions 230 and task management instructions 240 may be combined or consolidated. To the extent that a program is indicated separately from the discrete tasks to implement it, it should be quantifiable and having a specified time-table.

Multiple marketing programs may be developed to implement a particular marketing strategy. For example, if the marketing strategy involves developing a number of customers/prospects within a period of time, one marketing program may include "facilitating X number of meetings per month for individuals (peer-to-peer) with B segment decision makers". Another may include developing/hosting a user conference by D date having N number of attendees with B segment decision makers.

In a particular example, if the marketing strategy involves developing ambassadors and the marketing program involves "establishing 30 ambassadors from within 200 Segment A targets that each produce 4 designs by D date", the marketing program tactics and activities defines ambassador criteria and rewards, dates, people, costs, associated ambassador identification and ambassador "kits," as well as ambassador recruitment strategies and program implementation details. Marketing program generation module 232 provides a user interlace with user-selectable elements and inputs accessible by a user to select and/or configure the marketing program to implement the marketing strategy. Marketing program analysis module 234 processes the user input to verify that the user data is quantifiable (numeric, range of values, dates, etc.) and aligned with the associated marketing strategy. If not, marketing program analysis module 234 assists the user to refine the marketing program. Marketing program metrics 236 can be applied at a later time to evaluate the effectiveness of the marketing program for achieving the business outcome.

Task management instructions 240 provides an interface for assigning tasks to groups and/or individuals, for setting time tables, and for managing the timing of various steps or tasks. Tactic/step generation module 242 can be accessed by the user to specify a wide variety of tasks or steps to be performed to implement each marketing program. Such tasks or steps may be "invisible" with respect to the marketing program. A tactic is something used within a marketing program and multiple tactics may be employed as part of a single marketing program or strategy. Numerous activities may be needed to bring a tactic to fruition. Activities outline the steps for completing a tactic. Generally, activities are arranged in the order they are expected to occur, forming milestones. An example of a tactic could be a "user conference" with an associated performance target of "60% of Tier 1 and 80% of other customers attend the user conference with a 90% or greater event satisfaction score at a cost of $X per attendee resulting in at least three new opportunities added to the pipeline within one quarter of the conference," Some activity examples for the user conference can include "Create an invite list by D date", "Develop a conference theme and program by C date" (which will likely at least partially determine the invite list), "Sequre speakers by B date", "Create invitation by E date", etc.

Tactic/step assignment module 244 allows each task or step to be assigned to an owner (i.e., a person or group having primary responsibility for completing the particular task or action). Task management module 246 provides an interface for monitoring and updating the current status of various tasks and actions and to verify completion of various steps so that the marketing efforts stay on track. Task management module 246 may also provide information related to the available budget to ensure that the various tasks stay within the budget.

Budget/cost data instructions 250 manage budget and expenses for the marketing plan, providing a means for tracking such expenses. Historical data 252 includes data from performance of previous marketing blueprints, which can be used to estimate future marketing budgets and for providing a baseline for evaluating budget estimates and return on investment. Reporting module 254 can produce a marketing blueprint in electronic form for display and/or to a printer for reproduction on paper that displays the various tasks/activities to the marketing programs, the marketing programs to the marketing strategy, the marketing strategy to the marketing objective, and the marketing objective to the business outcome produced by the outcome-based map. A simplified example of a marketing blueprint is described below with respect to FIG. 3.

Figure 3:
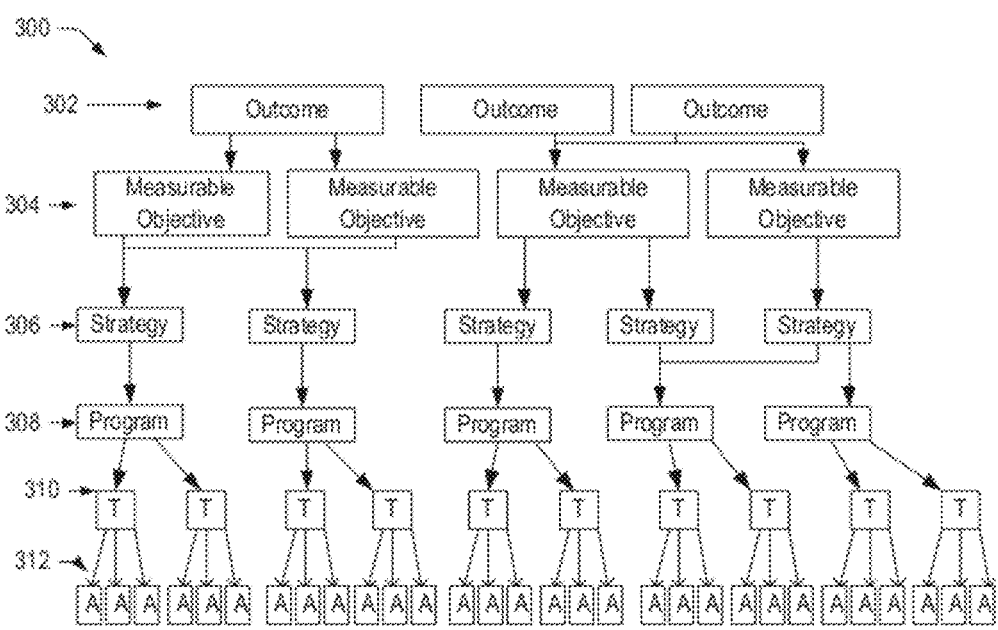
FIG. 3 is a block diagram of an embodiment of a simplified example of an outcome-based marketing blueprint that maps business outcomes to time-based milestones (tasks or activities) that can be created using the system of FIG. 1.

FIG. 3 is a block diagram of an embodiment of a simplified example of an outcome-based marketing blueprint 300 that maps business outcomes to time-based milestones (tasks or activities) that can be created using the system of FIG. 1. Outcome-based marketing blueprint 300 is constructed from the top down, in other words, from the quantifiable business outcome 302 as the starting point to the discrete tasks 310 and activities or actions 312.

Within outcome-based marketing blueprint 300, each quantifiable business outcome 302 is mapped to at least one measurable marketing objective 304. Each measurable marketing objective is mapped to at least one marketing strategy 306, which has a corresponding marketing program 308 for implementing the marketing strategy 306. Each marketing program 308 is linked to one or more tasks 310, and each task has one or more associated actions 312.

Using tactic/step assignment module 244, each task 310 and each action 312 may be assigned to one or more individuals, creating accountability within the team for completing each task or action. Outcome-based mapping instructions 130 can map the business outcomes to through various stages and down to the individual tasks. Success or failure of the marketing plan can be quantified and results information can be utilized to refine future marketing programs so that unsuccessful marketing strategies may be pruned and replaced with more efficient or effective strategies, and so on.

In the illustrated example of FIG. 3, a simplified marketing blueprint was described. An example of a marketing plan blueprint with representative outcome-based stages is described below with respect to FIG. 4.

Figure 4:
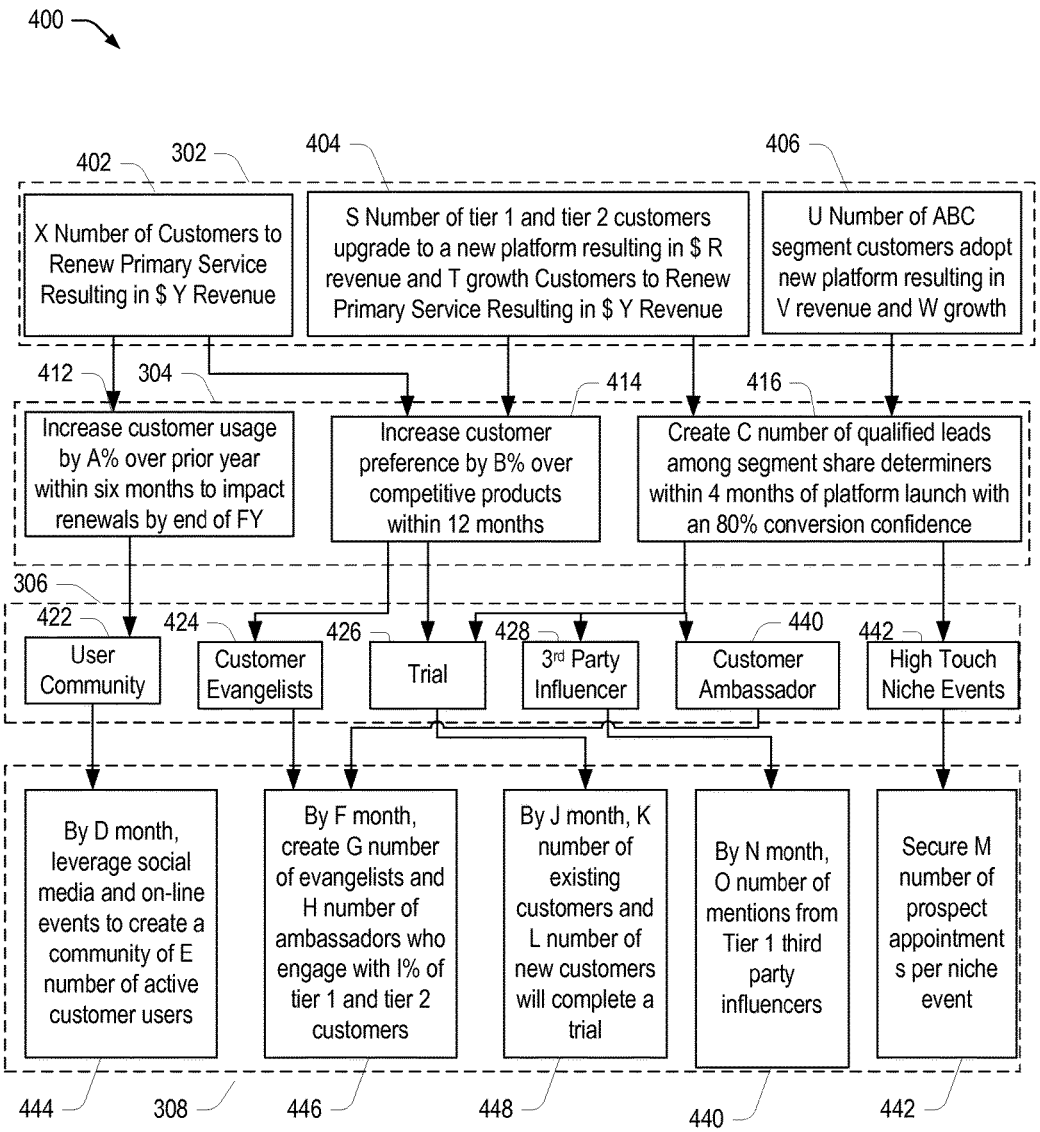
FIG. 4 is a block diagram of a representative example of a marketing plan blueprint that maps quantifiable business outcomes to quantifiable, time-based marketing milestones using the system of FIG. 1.

FIG. 4 is a block diagram of a representative example of a marketing plan blueprint 400 that maps quantifiable business outcomes to quantifiable, time-based marketing milestones using the system of FIG. 1. Marketing plan blueprint 400 includes outcome-based business objectives 302, which are linked to outcome-based marketing objectives 304, which in turn are linked to marketing strategies 306. Marketing strategies 306 are linked to marketing programs 308. Associated tactics and tasks are not shown, but each of the marketing programs 308 will have one or more associated tactics and/or tasks.

Outcome-based business objectives 302 includes a first business objective 402 labeled "X Number of Customers to Renew Primary Service resulting in $ Y Revenue", for example, by the end of the fiscal year. Outcome-based business objectives 302 further include a second business objective 404 labeled "S Number of Tier 1 and Tier 2 customers upgrade to a new platform resulting in $ R revenue and T growth in customers to renew primary service resulting in $ Y revenue" and a third business objective 406 labeled "U Number of ABC segment customers adopt new platform resulting in V revenue and W growth."

Outcome-based marketing objectives 304 include a first marketing objective 412 labeled "Increase customer usage by A % over prior year within six months to impact renewals"; a second marketing objective 414 labeled "Increase customer preference by B % over competitive products within 112 months"; and a third marketing objective 416 labeled "Create C number of qualified leads among segment share determiners within 4 months of platform launch with an 80% conversion confidence". First marketing objective 412 is linked to first business objective 402. Second marketing objective 414 is linked to both the first business objective 402 and to the second business objective 404. Third marketing objective 416 is linked to the second business objective 404 and to the third business objective 406.

Marketing strategies 306 include a user community strategy 422, a customer evangelist strategy 424, a trial strategy 426, a $3^{rd}$ party influencer strategy 428, a customer ambassador strategy 430, and a high touch/niche event strategy 432. The user community strategy 422 is linked to the first marketing objective 412. The customer evangelist marketing strategy 424 is linked to the second marketing objective 414. The trial marketing strategy 426 is linked to the second and third marketing objectives 414 and 416. The third party influencer marketing strategy 428, the customer ambassador marketing strategy 430 and the high touch/niche events marketing strategy 432 are linked to the third marketing objective 416.

Marketing programs 408 include a first marketing program 444 labeled "By D month leverage social media and on-line events to create a community of E number of active customer users"; a second marketing program 446 labeled "By F month create number of evangelists and H number of ambassadors who engage with 1% of Tier 1 and Tier 2 customers"; a third marketing program 448 labeled "By J month, K number of existing customers and L number of new customers will complete a trial"; a fourth marketing program 440 labeled "By N month, 0 number of mentions from Tier 1 third party influencers"; and a fifth marketing program 442 labeled "Secure M number of prospect appointments per niche event". First marketing program 444 is linked to user community marketing strategy 422. Second marketing program 446 is mapped to customer evangelists marketing strategy 424 and to customer ambassador marketing strategy 430. Third marketing program 448 is linked to trial marketing strategy 426. Fourth marketing program 440 is linked to third party influencer marketing strategy 428. Fifth marketing program 442 is linked to high touch/ niche events marketing strategy 432.

Each of the marketing programs 308 are associated with one or more tactics or activities (as previously discussed), which are generated, selected, or created to perform the marketing program. For example, to implement third marketing program, one task may be to design the parameters for a trial, including duration, type, and other information by D date. Another task may include creating a list of prospective purchasers from the existing customer base to whom a trial offer will be extended.

In operation, computing system 102 allows the user to configure the mapping in a variety of ways, based on experience of the user as well as the particular programs, strategies, and marketing objectives. Further, mappings can be created and then refined by the user as desired. In some instance, an activity that is linked to two different marketing programs may be a candidate for dividing into two different activities to better track performance.

Figure 5:
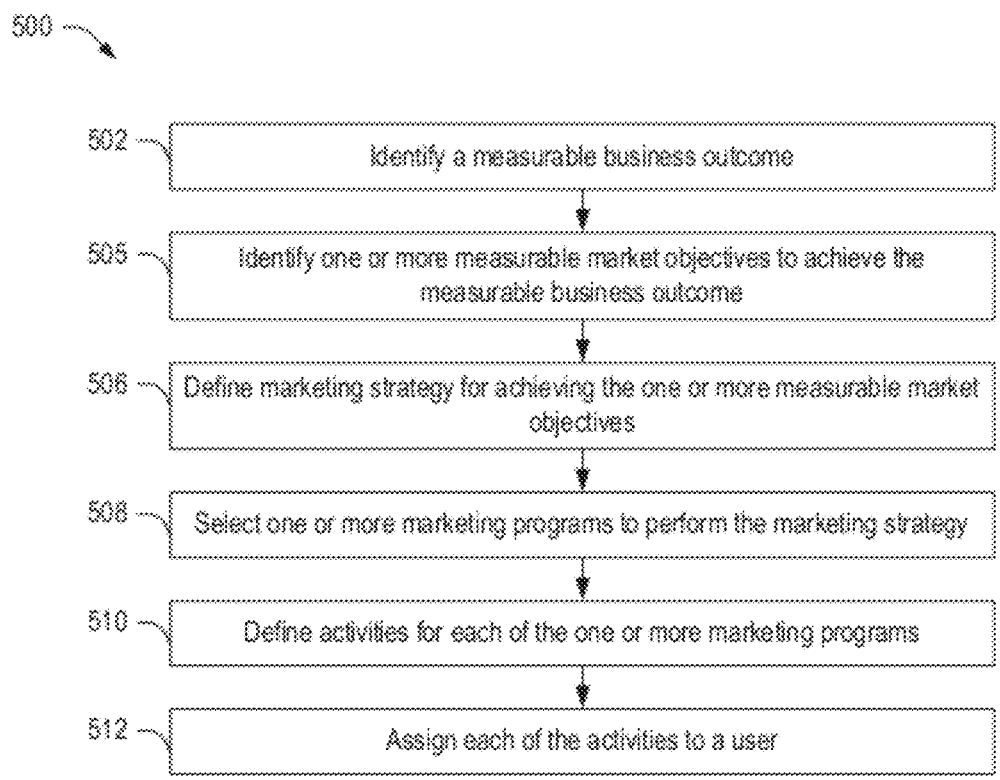
FIG. 5 is a flow diagram of an embodiment of a method for providing outcome-based mapping linking quantifiable business objectives to time-based marketing milestones.

FIG. 5 is a flow diagram of an embodiment of a method 500 of providing an outcome-based mapping linking quantifiable business objectives to time-based marketing milestones. At 502, a measurable business outcome is identified based on user-interaction with computing system 102. The user may define multiple business outcomes. Each business outcome includes at least one quantity, range, or percentage associated with customers, a date or timeframe, and a quantifiable business (or revenue) target.

Advancing to 504, one or more measurable market objectives are identified to achieve the measurable business outcome through user-interaction with computing system 102. As discussed above, each market objective should include a quantity, range or percentage value and a date, and should align to the business outcome. Moving to 506, a marketing strategy is defined for achieving each of the one or more measurable objectives through user-interaction with computing system 102. Continuing to 508, one or marketing programs are selected, defined, or created for performing each marketing strategy through user-interaction with computing system 102. Proceeding to 510, activities (or tasks) are defined for each of the one or more marketing programs through user-interaction with computing system 102. Advancing to 512, each of the activities is assigned to a user (group or team) through user-interaction with computing system 102.

It should be appreciated that at each of the above-described blocks 502-512, computing system 102 may executed analysis instructions to verify the user input to ensure that the user input defines the various aspects with sufficient specificity to provide a measurable marketing plan. The resulting marketing blueprint provides measurable milestones and quantifiable outcomes, making it possible to measure the contribution of each marketing aspect to the desired business outcome.

Through the user-interactions with computing system 102, the user configures a top-down marketing plan that begins with the quantifiable business outcome and that ends with the assignment of the individual tasks, producing a marketing blueprint that is quantifiable and that includes readily measurable milestones and cost targets. The marketing blueprint can be presented to a display for further refinement, shared among multiple users via a network, and/or printed for distribution within a marketing team. Users can interact with computing system 102 to add activities, to check off completed actions or tasks, and to continue to refine the marketing blueprint during the process. The marketing blueprint provides a tracking mechanism that allows for such adjustments based on measurable results and the creation of a marketing dashboard. Further, computing system 102 can be used to track the progress of the marketing plan, making it possible to adjust trajectories and refine previously-made decisions so that marketing efforts remain aligned to the business outcome.

In the above-examples, a computing system 102, a marketing blueprint, and methods are described for producing a marketing blueprint. The computing system 102, as described above, provides a graphical user interface (variously called a "GUI", a "user interface", and a "graphical user interface") including graphical elements (images, etc.), user-selectable elements (pull-down menus, click links, tabs, buttons, check boxes, text inputs, etc.), text, and user input fields for receiving user inputs to define the various aspects of the marketing blueprint. One possible example of numerous possible implementations of such a GUI for receiving user data is described below with respect to FIG. 6.

Figure 6:
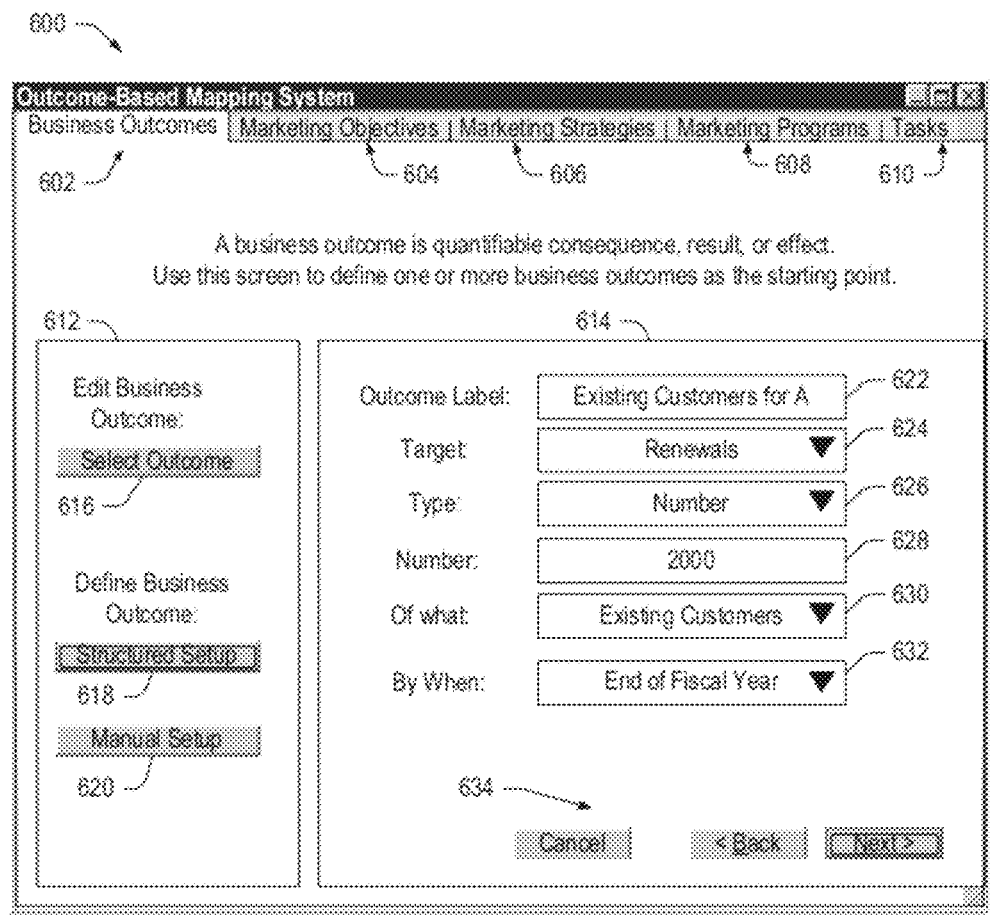
FIG. 6 is a diagram of a representative example of an embodiment of a graphical user interface produced by the computing system of FIG. 1 for receiving user inputs to produce an outcome-based mapping of business outcomes to marketing activities.

FIG. 6 is a diagram of a representative example of an embodiment of a graphical user interface (GUI) 600 produced by the computing system 102 of FIG. 1 for receiving user inputs to produce an outcome-based mapping of business outcomes to marketing activities. GUI 600 may be rendered within a window of an Internet browser application or may be rendered as a standalone window. GUI 600 includes a plurality of user-selectable tabs including a first tab 602 labeled "Business Outcomes", a second tab 604 labeled "Marketing Objectives", a third tab 606 labeled "Marketing Strategies", a fourth tab 608 labeled "Marketing Programs", and a fifth tab 610 labeled "Tasks". The first tab 602 is currently selected displaying a business outcomes control panel 612 and a configuration panel 614.

Business outcomes control panel 612 includes a first user-selectable button 616 labeled "Select Outcome", which is accessible by the user via a user input device (such as a mouse, a pointer, a touch-screen interface, a keyboard, a keypad, or some other input device) to select an existing business outcome (i.e., a quantifiable business outcome that was previously created). In some instances, computing system 102 may include speech recognition capabilities, making it possible for the user to select the first user-selectable button 616 through spoken commands. Business outcomes control panel 612 further includes a second user-selectable button 618 labeled "Structured Setup" and a third user-selectable button 620 labeled. "Manual Setup" for defining a new business outcome. If the user selects the third user-selectable button 620, configuration panel 614 may provide a text input for receiving a free-form text input to define a business objective. This option may be suitable for experienced users. In this instance, the user has selected the second user-selectable option 618 labeled "Structured Setup", and configuration panel 614 displays a set of inputs accessible by the user to de/ioca quantifiable business outcome.

Configuration panel 614 includes a text input 622 for receiving user input to name the business outcome. In this case, the user has named the business outcome "Existing Customers for A" where A may be a product or service offered by the company. Configuration panel 614 further includes pull-down menus 624, 626, 630, and 632. Pull-down menu 624 corresponds to the particular target (such as renewal customers, new customers, Tier 1 customers, etc.). The options within pull-down menu 624 may be configured by the user during a set-up operation (not shown) or may be pre-configured. In this instance, the user has selected "Renewals" from the pull-down menu 624.

Configuration panel 614 further includes a pull-down menu 626, which corresponds to a quantifiable type, such as a date range, a number, a percentage, etc. Selection of "range" for example causes GUI 600 to update configuration panel 614 to receive a range of values or to receive two different values. In this instance, the user has selected "Number" using pull-down menu 626. Further, the user has entered "2000" in the numeric input 628. The user has selected "Existing Customers" from pull-down menu 630, and a date indicating "End of Fiscal Year" from pull-down menu 632, Further, buttons 634 provide a means by which the user may interact with GUI 600 to navigate through the various tabs and/or to cancel the data entry. Alternatively, the user may select a next tab and continue configuring the marketing data.

It should be appreciated that, in this example, the user content of configuration panel 614 is made up and that the pull-down menus and data fields can be provided with any number of selection options, which may or may not alter the subsequent fields or data entry points in the configuration window. Further, it should be understood that this is just one example of many possible GUIs that could be used to receive user inputs for configuring a quantifiable business outcome. In this instance, the business outcome would include a quantity 2000 that is customer-centric (renewals of existing customers) and that has an end date (end of the fiscal year). This combination of elements ties the business outcome to customer actions (something marketing is designed to impact) and provides a measurable quantity and a defined end date, making the business outcome measurable in terms of marketing.

The other tabs 604, 606, 608, and 610 can provide manual input fields and/or structured inputs with multiple user-selectable elements for configuring marketing objectives, marketing strategies, marketing programs, and tasks (activities) as discussed above. Further, other tabs may be provided or some tabs may be consolidated, depending on the implementation.

in conjunction with the systems, methods, computer-readable media, GUIs, and a methodology described above with respect to FIGS. 1-6, a system is described that assists the user in developing a marketing blueprint that is mapped to quantifiable business outcomes.

Although the present invention has been described with reference to preferred embodiments, workers skilled in the art will recognize that changes may be made in form and detail without departing from the scope of the invention.

What is claimed is:

1. A non-transitory computer readable medium comprising instructions to guide a user to construct an outcome-based marketing plan that, when executed by a processor, cause the processor to:
   generate a graphical user interface including text, a plurality of user-selectable options, and text input fields, the graphical user interface configured to prompt a user through a process of defining a business outcome-based marketing plan; and
   receive user input corresponding to the graphical user interface defining the business outcome-based marketing plan starting from a business outcome and subsequently proceeding through a plurality of stages of the marketing plan, each stage including at least one element associated with the business outcome and with one or more element of each previous stage of said plurality of stages, wherein the instructions comprise a set of business outcome instructions at a top level and a plurality of subsequent sets of instructions corresponding to different ones of the plurality of stages of the marketing plan at lower levels;
   wherein the graphical user interface generates a control panel that allows a user to edit an existing business outcome and to select a mode of defining a new business outcome,
   wherein in response to a selection of a first mode of defining the new business outcome by a user, the business outcome instructions cause the processor to generate a text input field of the graphical user interface to receive free form text for defining the new business outcome and in response to receiving the free form text to:
      analyze the free form text to determine whether the new business outcome is quantifiable;
      if the new business outcome is not quantifiable, prompt the user to receive further user input to form a refined business outcome; and
      if the refined business outcome is quantifiable, proceed through the plurality of subsequent sets of instructions of the marketing plan to map the at least one element of each of the plurality of stages to the refined business outcome through previous elements to produce a marketing blueprint, and
   wherein in response to a selection of a second mode of defining the business outcome by the user, the business outcome instructions cause the processor to generate a configuration panel of the graphical user interface to receive a plurality of structured inputs from the user using corresponding pull-down menus for defining the new business outcome.

2. The non-transitory computer readable medium of claim 1, wherein one of the plurality of stages comprises a task stage having a plurality of associated marketing tasks, and each of the associated marketing tasks comprises at least one action and a corresponding deadline.

3. The non-transitory computer readable medium of claim 1, wherein one of the plurality of stages comprises a task stage having a plurality of associated marketing tasks, and each of the associated marketing tasks comprises at least one action and a corresponding goal.

4. The non-transitory computer readable medium of claim 1, wherein the marketing blueprint comprises at least one quantifiable milestone.

5. The non-transitory computer readable medium of claim 1, wherein one of the plurality of stages comprises a task stage having a plurality of associated marketing tasks, and each of the associated marketing tasks comprises at least one action and a corresponding cost.

6. The non-transitory computer readable medium of claim 1, wherein one of the plurality of stages comprises a task stage having a plurality of associated marketing tasks, and further comprising additional instructions that, when executed, cause the processor to:
receive data related to performance of the associated marketing tasks; and
analyze the data to quantify an effectiveness of the marketing blueprint to achieve the business outcome, wherein the effectiveness of the marketing blueprint is determined by comparing the data to historical data.

7. The non-transitory computer readable medium of claim 6, further comprising additional instructions that, when executed, cause the processor to:
produce metric data in response to the effectiveness of the marketing blueprint;
include the metric data within the graphical user interface; and
provide the graphical user interface to an output device.

8. A file server system for guiding a user to construct an outcome-based marketing plan comprising:
a host processor;
a network interface coupled to the host processor and configured to communicate with a remote processor over a network;
a memory coupled to the host processor and adapted to store instructions that, when executed by the remote processor, cause the remote processor to:
generate a graphical user interface including text, a plurality of user-selectable options, and text input fields, the graphical user interface configured to prompt a user through a process of defining a business outcome-based marketing plan; and
receive user input corresponding to the graphical user interface defining the business outcome-based marketing plan starting from a business outcome and subsequently proceeding through a plurality of stages of the marketing plan, each stage including at least one element associated with the business outcome and with one or more element of each previous stage of said plurality of stages, wherein the instructions comprise a set of business outcome instructions at a top level and a plurality of subsequent sets of instructions corresponding to different ones of the plurality of stages of the marketing plan at lower levels;
wherein the graphical user interface generates a control panel that allows a user to edit an existing business outcome and to select a mode of defining a new business outcome,
wherein in response to a selection of a first mode by a user, the business outcome instructions cause the remote processor to generate a text input field of the graphical user interface to receive free form text for defining the new business outcome and in response to receiving the free form text to:
analyze the user input to determine whether the new business outcome is quantifiable;
if the new business outcome is not quantifiable, prompt the user to receive further user input to form a refined business outcome; and
if the refined business outcome is quantifiable, proceed through the plurality of subsequent sets of instructions of the marketing plan to map at least one element of each of the plurality of stages to the refined business outcome through previous elements to produce a marketing blueprint, and
wherein in response to a selection of a second mode of defining the business outcome by the user, the business outcome instructions cause the host processor to generate a configuration panel of the graphical user interface to receive a plurality of structured inputs from the user using corresponding pull-down menus for defining the new business outcome.

9. The file server system of claim 8, wherein the memory stores further instructions that, when executed, cause the remote processor to provide the marketing blueprint to an output device coupled to the remote processor, wherein output device comprises a display.

10. The file server system of claim 8, wherein the marketing blueprint comprises at least one marketing strategy.

11. The file server system of claim 8, wherein the memory stores additional instructions that, when executed by the remote processor, cause the remote processor to:
receive data related to performance of the refined business outcome and associated marketing tasks; and
analyze the data to determine an effectiveness of the marketing blueprint to achieve the refined business outcome.

12. A method for guiding a user to construct an outcome-based marketing plan comprising:
generating a graphical user interface by a computing system including user prompts, a plurality of user-selectable options, and text input fields on a display;
receiving user input from the computing system defining a marketing plan starting from a business outcome and subsequently proceeding through a plurality of stages of the marketing plan, each stage including at least one element associated with the business outcome and with one or more elements of each previous stage of said plurality of stages, at an input device of the computing system;
wherein the generating includes generating a control panel that allows a user to edit an existing business outcome and to select a mode of defining a new business outcome;
receiving a selection of a the mode of defining the new business outcome by a user;
in response to receiving a selection of a first mode of defining the new business outcome by the user, receiving from a text input field of the graphical user interface free form text for defining the new business outcome and in response to receiving the free form text:

analyzing the free form text to determine whether the business outcome is quantifiable;
if the new business outcome is not quantifiable, prompting the user to receive further user input to form a refined business outcome; and
if the refined business outcome is quantifiable, mapping at least one element of each of the plurality of stages to the refined business outcome through previous elements by the computing system to produce a marketing blueprint, and
in response to a selection of a second mode of defining the new business outcome by the user, receiving from a configuration panel of the graphical user interface a plurality of structured inputs from the user using corresponding pull-down menus for defining the new business outcome.

13. The method of claim 12, wherein the mapping at least one element of each of the plurality of stages to the refined business outcome through the previous elements by the computing system to produce the marketing blueprint comprises:
identifying one or more marketing strategies for each of the one or more elements of each previous stage of said plurality of stages.

14. The method of claim 13, wherein the mapping at least one element of each of the plurality of stages to the refined business outcome through the previous elements by the computing system to produce the marketing blueprint further comprises:
defining one or more milestones for each of the one or more marketing strategies.

15. The method of claim 14, wherein the at least one element of each of the plurality of stages to the refined business outcome through the previous elements by the computing system to produce the marketing blueprint further comprises:
assigning one or more activities for each of the one or more milestones to a resource, wherein the resource is a selected one of a person and a group.

16. The method of claim 12, further comprising:
receiving data related to performance and results from one or more quantifiable marketing objectives at the input device of the computing system; and
analyzing relative effectiveness of the marketing blueprint by the computing system in response to receiving the data.

17. The method of claim 16, further comprising:
providing metric data related to the relative effectiveness of the marketing blueprint to the graphical user interface by the computing system.

18. The non-transitory computer readable medium of claim 1, wherein in response to a selection of a second mode by the user, the instructions further cause the processor to receive a structured input for defining the business outcome, and in response to receiving the structured input to:
map the at least one element of each of the plurality of stages to the business outcome through previous elements to produce the marketing blueprint.

19. The file server system of claim 8, wherein in response to a selection of a second mode by the user, the instructions further cause the remote processor to receive a structured input for defining the business outcome, and in response to receiving the structured input to:
map the at least one element of each of the plurality of stages to the business outcome through previous elements to produce the marketing blueprint.

20. The method of claim 12, wherein the method further comprises:
in response to a selection of a second mode by the user, receiving a structured input for defining the business outcome, and in response to receiving the structured input to:
map the at least one element of each of the plurality of stages to the business outcome through previous elements to produce the marketing blueprint.

* * * * *